United States Patent Office 3,558,528
Patented Jan. 26, 1971

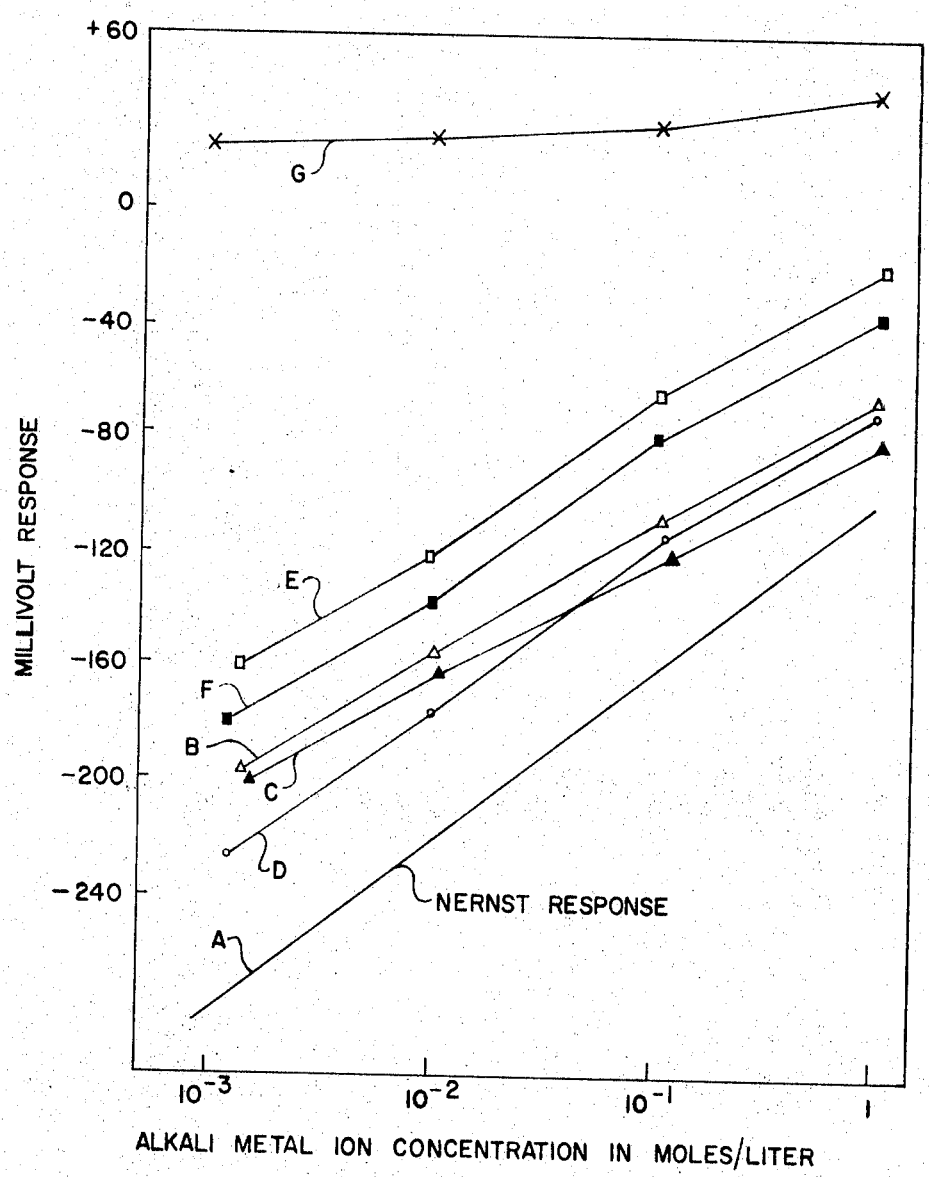

3,558,528
ALKALI METAL ION SENSITIVE GLASS
Richard P. Buck, Chapel Hill, N.C., and Robert W. Nolan, South Laguna, Calif., assignors to Beckman Instruments, Inc., a corporation of California
Filed Nov. 4, 1968, Ser. No. 773,171
Int. Cl. C03c 3/04; H01b 1/06
U.S. Cl. 252—520                                                  5 Claims

ABSTRACT OF THE DISCLOSURE

A soda-silicate glass containing about 6 to 9 mole percent of an admixture of $ZrO_2$ and $TiO_2$. The glass has exceptionally low electrical resistance and is sensitive to alkali metal ions, such as potassium and sodium ions. The glass is particularly suited for formation into ion sensitive bulbs of glass electrodes utilized for measuring alkali metal ion concentrations of solutions.

BACKGROUND OF THE INVENTION

The present invention relates generally to a glass and, more particularly, to a low resistance glass which is sensitive to sodium and potassium ions.

While the present invention will be described herein specifically as relating to a glass for the measurement of ion concentrations of solutions, it is understood that the glass, due to its exceptional low resistance, may find other uses, such as a solid electrolyte for use in fuel cells or batteries.

Considerable research effort has been expended in recent years in the development of glasses which are sensitive to sodium and potassium ions. Such glasses are useful as the ion sensitive barriers of glass electrodes for measuring sodium and potassium ions such as in biological samples, body fluids, and soil samples. The most thoroughly investigated glasses of this type are alkali metal-alumino-silicate glasses wherein the alumina is the component in the glasses which renders them sensitive to alkali metal ions, namely, potassium, sodium or lithium ions. Recent studies have shown that the alumina in the alkali metal-silicate glasses may be replaced by other metals, such as gallium, beryllium and boron. Alkali metal-silicate glasses have also been studied containing $TiO_2$, $ZrO_2$, $GeO_2$, $SnO_2$, $P_2O_3$ and $Sb_2O_3$. A thorough description of recent developments in alkali metal-silicate glasses of the above described compositions may be found in pp. 89–98 of Glass Electrodes of Hydrogen and Other Cations, published by Marcel Dekker Inc., 1967.

SUMMARY OF THE INVENTION

The principal object of the present invention is to provide a novel alkali metal ion sensitive glass having exceptionally low electrical resistance.

Another object of the invention is to provide a sodium silicate glass which is selectively sensitive to sodium and potassium ions in solutions having a relatively high hydrogen ion concentration.

According to the principal aspect of the present invention, there is provided a sodium silicate glass containing about 6 to 9 mole percent, calculated from the prefusion mixture, of an admixture of $ZrO_2$ and $TiO_2$. It has been found that this glass is easily melted and worked into the form of glass electrode bulbs, is highly sensitive to sodium and potassium ions even at relatively low pH levels of test solutions, and has an exceptionally low electrical resistance.

Other objects, aspects and advantages of the invention will become apparent from the following description taken in connection with the accompanying drawing.

BRIEF DESCRIPTION OF THE DRAWING

The drawing illustrates a graph showing data for actual millivolt responses of glass electrodes having an ion sensitive portion formed of one of the glasses of the present invention.

DESCRIPTION OF THE PREFERRED EMBODIMENTS

We have unexpectedly found that a sodium silicate glass containing about 6 to 9 mole percent of $ZrO_2$ and $TiO_2$ is highly responsive to sodium and potassium ions, has exceptionally low resistance, less than 0.20 megohm, and may be readily melted and worked into ion sensitive bulbs for glass electrodes. It is to be understood that the mole percentages disclosed herein are percentages which are calculated from the prefusion mixture of the components utilized to formulate the particular glass being discussed.

The preferred glasses of the invention have compositions within the range of 58 to 64 mole percent $SiO_2$, 27 to 33 mole percent $Na_2O$ and 6 to 9 mole percent $ZrO_2$ and $TiO_2$ with preferably the $ZrO_2$ being present in an amount at least as great as about 4 mole percent. The glasses are free of alumina which is found in commercially available sodium silicate glasses which are sensitive to alkali metal ions as well as in lithium silicate glasses which are selectively sensitive to sodium ions in the presence of potassium ions. It is noted that glasses which are sensitive to both sodium and potassium ions are often referred to in the art as "cation" sensitive glasses.

The above percentage ranges of $Na_2O$ and $SiO_2$ are preferred and not limiting. For example, the $SiO_2$ content of the glasses could be increased, but the glasses become more difficult to melt with conventional glass melting equipment. If the $SiO_2$ content is decreased and the $Na_2O$ increased, the glasses are less stable than those having compositions falling within the above preferred ranges. Also, if the combined $ZrO_2$ and $TiO_2$ exceeds 9 mole percent, the glasses become highly refractory and thus difficult to melt and work while, if the $ZrO_2$ percentage decreases appreciably below 4 mole percent, the selectivity of the glasses to potassium and sodium ions over hydrogen ions diminishes significantly. It is further noted that a minor portion, not exceeding about 8 percent, of the $Na_2O$ in the glasses of an invention may be replaced with $K_2O$ without adversely affecting the characteristics of the glasses.

The glasses of the invention may be produced from conventional glass making batch ingredients by using conventional glass making techniques. The prefusion batch materials, for example, include silica sand, sodium carbonate, zirconium dioxide and titanium dioxide. The batch ingredients of the glasses are thoroughly mixed together and melted in a refractory crucible and heated until a molten mass is formed. Glasses of the present invention have been melted by heating the batch ingredients in a platinum-rhodium crucible at a temperature of about 1400 to 1450° C. The molten mass was maintained at such elevated temperature for sufficient time to yield a bubble-free magma. It is noted that the above temperature is less than the temperature required to melt the previously-mentioned commercially available alkali metal-alumino-silicate glasses, namely, on the order of 1550° C. to 1800° C. The above method of making glasses is well known in the art and forms no part of the present invention.

The bubble-free magma produced in the manner described above may be easily worked into bulbs for glass electrodes. A suitable method for forming bulbs for glass electrodes is described in U.S. Pat. No. 2,346,470 to Cary and Baxter entitled "Method of Making Glass Electrodes."

A number of glasses which have compositions falling within the preferred ranges mentioned above have been formed into glass bulbs of ion measuring electrodes and tested for their alkali metal ion sensitivity. The compositions of these glasses are listed in the following Table I:

TABLE I

| Glass No.: | Composition in mole percent calculated from prefusion mixture | | | | Resistance (megohms) |
|---|---|---|---|---|---|
| | $SiO_2$ | $Na_2O$ | $ZrO_2$ | $TiO_2$ | |
| 1 | 60.2 | 31.4 | 4.2 | 4.2 | 0.15 |
| 2 | 60.2 | 31.4 | 5.9 | 2.5 | 0.10 |
| 3 | 60.2 | 31.4 | 6.3 | 2.1 | 0.10 |
| 4 | 60.2 | 31.4 | 6.72 | 1.68 | 0.08 |
| 5 | 60.2 | 31.4 | 7.56 | 0.84 | 0.10 |
| 6 | 58.2 | 33.4 | 6.72 | 1.68 | 0.06 |

The bulbs of the electrodes having the compositions disclosed in Table I had a diameter of about 8 to 10 millimeters. The resistances of these bulbs were measured with a 3 M KCl solution inside the electrodes and an arbitrary KCl level outside using silver-silver chloride half cells and an applied voltage of at least 1 volt. The electrical resistances of the bulbs are indicated in the last column in Table I. It is noted that all of the bulbs had resistances less than 0.20 megohm, with Glass No. 6 having a resistance of only 0.06 megohm. The previously mentioned commercial alkali metal ion measuring electrode having an ion sensitive bulb of a composition comprising 26.8 mole percent $Na_2O$, 4.0 mole percent $Al_2O_3$ and 69.2 mole percent $SiO_2$ has an electrical resistance of about 30 megohms. Some commercially available general purpose pH glass electrodes have resistances on the order of 50 to 70 megohms. Thus, it can be seen that the resistances of the bulbs formed of our glasses are exceptionally low. It is for this reason that the glasses of the present invention would be particularly useful as conducting spacers in batteries or fuel cells.

It is known that the selectivity of an electrode toward a first ion in the presence of a second ion may be measured by the response of the electrode toward varying concentrations of the first ion, the second ion being also present in widely varying amounts. An ideal electrode would exhibit ideal "Nernstian response, i.e., at 25° C. an ideal electrode would always produce a 59.16 millivolt change per ten fold change of concentration of the first ion, regardless of the background amounts of the potentially interfering ions. Thus, if an electrode is to be utilized for measuring alkali metal ion concentrations of solutions, it must be capable of producing Nernstian response over a wide range of hydrogen ion concentrations in solutions.

Electrodes having bulbs of the compositions disclosed in Table I have been tested in a conventional manner in separate sodium and potassium ion solutions having various concentrations of hydrogen ions in order to determine the selectivity of the glasses to these alkali metal ions over hydrogen ions. The glass electrodes were tested by immersing the same together with standard calomel reference electrodes in the test solutions, with the electrode pairs being connected by a conventional pH meter. The ionic concentrations of the solutions were determined by measuring the potential difference developed between the glass electrodes and the reference electrodes as indicated by the pH meter.

Reference is made to the drawing, which shows the millivolt response of electrodes having ion sensitive bulbs formed of Glass No. 4 disclosed in Table I in various alkali metal ion test solutions having different hydrogen ion concentrations. Curve A represents the response of an electrode if it were sensitive only to sodium or potassium ions while at the same time responding not at all to changes in hydrogen ion concentration. Curve B shows the response of an electrode over a three decade change in sodium ion concentration of a $NaHCO_3$-$Na_2CO_3$ test solution having a pH of 10. Curve C shows the response of an electrode over a three decade change of potassium ion concentration of a $KHCO_3$-$K_2CO_3$ test solution having a pH of 10. Curves D, E and F show the responses of three electrodes over a three decade change of sodium ion concentration of a $NaH_2PO_4$-$H_3PO_4$ test solution having a pH of 3.5. Curve G shows the response of an electrode over a three decade change of sodium ion concentration of a NaCl-HCl test solution having a pH of 2.

From the curves in the drawing, it is seen that at pH 2, the response of the electrode formed of our Glass No. 4 is dominated by hydrogen ions. However, the electrode approaches Nerstian behavior over a three decade change of either potassium or sodium ions of test solutions having a pH as low as 3.5. Similar tests on the other glasses disclosed in Table I show the same results. It is quite unexpected that our zirconium bearing glass electrodes produce almost Nernstian response to alkali metal ions in solutions having a pH as low as 3.5 since, as indicated at p. 97 of Glass Electrodes for Hydrogen and Other Cations, $Li_2O$-$ZrO_2$-$SiO_2$ glasses containing as much as 9 mole percent $ZrO_2$ have alkali metal ion response in only neutral and alkaline solutions. Thus, the glasses of the present invention are particularly useful for measuring alkali metal ions in solutions having a high hydrogen ion concentration.

It will be understood that variations or modifications of the specific figures disclosed and discussed above may be made without necessarily departing from the spirit of the invention, the scope of which is defined by the appended claims.

What is claimed is:

1. A low resistance, alkali metal ion sensitive glass having a composition essentially of $SiO_2$, $Na_2O$ and about 6–9 mole percent, calculated from the prefusion mixture, of an admixture of $ZrO_2$ and $TiO_2$.

2. A glass as set forth in claim 1 wherein said composition is devoid of $Al_2O_3$.

3. A glass as set forth in claim 1 containing, in mole percent calculated from the prefusion mixture, about 58–64 silica and about 27–33 $Na_2O$.

4. A glass as set forth in claim 1 having a composition, in mole percent calculated from the prefusion mixture, consisting essentially of about 60.2 silica, 31.4 $Na_2O$, 1.68 $TiO_2$ and 6.7 $ZrO_2$.

5. A glass as set forth in claim 1 wherein said $ZrO_2$ is present in an amount at least as great as about 4 mole percent calculated from the prefusion mixture.

References Cited

UNITED STATES PATENTS

| 3,410,777 | 11/1968 | Ross | 106—52 |
| 3,416,936 | 12/1968 | Sproul | 106—52 |
| 3,471,392 | 10/1969 | Kansky | 136—153 |

DOUGLAS J. DRUMMOND, Primary Examiner

U.S. Cl. X.R.

106—52; 136—153; 204—195